United States Patent
Ponnuraj et al.

(10) Patent No.: US 9,085,996 B2
(45) Date of Patent: Jul. 21, 2015

(54) SYSTEM FOR MANAGING EXHAUST FLOW FOR A GAS TURBINE

(71) Applicant: General Electric Company, Schenectady, NY (US)

(72) Inventors: Balakrishnan Ponnuraj, Sugar Land, TX (US); Przemyslaw Sebastian Drezek, Warsaw (PL); Fernando Lopez-Parra, Warsaw (PL)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 247 days.

(21) Appl. No.: 13/789,573

(22) Filed: Mar. 7, 2013

(65) Prior Publication Data

US 2014/0157778 A1  Jun. 12, 2014

(30) Foreign Application Priority Data

Dec. 6, 2012 (PL) .......................................... 401926

(51) Int. Cl.
 *F02C 7/08* (2006.01)
 *F01D 25/30* (2006.01)
 *F02C 7/00* (2006.01)

(52) U.S. Cl.
 CPC .............. *F01D 25/305* (2013.01); *F01D 25/30* (2013.01); *F02C 7/00* (2013.01); *Y02E 20/16* (2013.01); *Y02E 20/18* (2013.01)

(58) Field of Classification Search
 CPC .......... F01D 25/305; F01D 25/30; F02C 7/00
 USPC ........... 60/39.5, 805, 772, 751, 752; 415/207, 415/119, 226, 211.2, 208.2
 See application file for complete search history.

(56) References Cited

U.S. PATENT DOCUMENTS

| | | | | |
|---|---|---|---|---|
| 5,129,226 A | * | 7/1992 | Bigelow et al. | 60/765 |
| 5,160,080 A | * | 11/1992 | Hines et al. | 60/774 |
| 5,588,635 A | | 12/1996 | Hartman | |
| 5,603,605 A | * | 2/1997 | Fonda-Bonardi | 415/211.2 |
| 7,578,369 B2 | * | 8/2009 | Francisco et al. | 181/213 |
| 8,109,720 B2 | * | 2/2012 | Merchant et al. | 415/207 |
| 2005/0120699 A1 | * | 6/2005 | Han et al. | 60/39.5 |
| 2006/0156730 A1 | * | 7/2006 | Dinu et al. | 60/723 |
| 2007/0068167 A1 | * | 3/2007 | Patel et al. | 60/772 |
| 2009/0257868 A1 | * | 10/2009 | Fonda-Bonardi | 415/211.2 |
| 2010/0247304 A1 | * | 9/2010 | Merchant et al. | 415/207 |
| 2011/0088398 A1 | | 4/2011 | Subbarao et al. | |

* cited by examiner

Primary Examiner — Hoang Nguyen

(74) Attorney, Agent, or Firm — Fletcher Yoder, P.C.

(57) ABSTRACT

A system includes a gas turbine enclosure. The system also includes a gas turbine engine disposed in the gas turbine enclosure, wherein the gas turbine engine is configured to output an exhaust flow. The system further includes an exhaust driven eductor configured to draw an air flow through and out of the gas turbine engine enclosure using the exhaust flow. The system yet further includes an exhaust stack coupled to the gas turbine enclosure, wherein the exhaust stack is configured to output a mixed flow of the exhaust flow and the air flow. The system still further includes a diffuser plate disposed within the exhaust stack, wherein the diffuser plate is configured to provide a homogenous flow distribution for the mixed flow downstream of the diffuser plate.

25 Claims, 3 Drawing Sheets

SYSTEM FOR MANAGING EXHAUST FLOW FOR A GAS TURBINE

CROSS-REFERENCE TO RELATED APPLICATIONS

This application claims priority to and the benefit of Polish Application No. P-401926, entitled "SYSTEM FOR MANAGING EXHAUST FLOW FOR A GAS TURBINE", filed Dec. 6, 2012, which is herein incorporated by reference in its entirety.

BACKGROUND OF THE INVENTION

The subject matter disclosed herein relates to systems for managing exhaust flow for gas turbines.

Gas turbines are used in a variety of applications. For example, gas turbine generators are often used to produce electricity for a power grid. The gas turbine generators are typically stationary units disposed in a power plant, such as an integrated gasification combined cycle (IGCC) power plant. However, the gas turbine generators also may be used in mobile units, such as large trailers. In either configuration, each gas turbine generator may be housed within in an enclosure having a ventilation system. The ventilation system removes heat from the enclosure, and may direct this removal heat into an exhaust stack used for the gas turbine exhaust. The stack may include a silencer section configured to reduce noise from the gas turbine. As a result of the high temperatures and high velocities seen in the exhaust collector, the material contained in the silencer baffles may experience rapid deterioration and damage. For this reason, it is advisable to minimize inasmuch as possible the flow velocity in this section.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a gas turbine enclosure. The system also includes a gas turbine engine disposed in the gas turbine enclosure, wherein the gas turbine engine is configured to output an exhaust flow. The system further includes an exhaust driven eductor configured to draw an air flow through and out of the gas turbine engine enclosure using the exhaust flow. The system yet further includes an exhaust stack coupled to the gas turbine enclosure, wherein the exhaust stack is configured to output a mixed flow of the exhaust flow and the air flow. The system still further includes a diffuser plate disposed within the exhaust stack, wherein the diffuser plate is configured to provide a homogenous flow distribution for the mixed flow downstream of the diffuser plate.

In accordance with a second embodiment, a system includes an exhaust driven eductor configured to draw an air flow through and out of a gas turbine enclosure using an exhaust flow from a gas turbine engine disposed in the gas turbine enclosure. The system also includes a diffuser plate configured to mount within an exhaust stack downstream from the exhaust driven eductor and upstream from a silencer section in the exhaust stack, wherein the diffuser plate is configured to provide an even flow distribution through the silencer section.

In accordance with a third embodiment, a system includes a diffuser plate that includes multiple orifices, wherein the diffuser plate is configured to mount within an exhaust stack coupled to a gas turbine enclosure having a gas turbine, wherein the diffuser plate is configured to provide a homogenous flow distribution, downstream of the diffuser plate, for a mixed flow comprising an exhaust flow from the gas turbine and a ventilation airflow driven by an exhaust driven eductor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
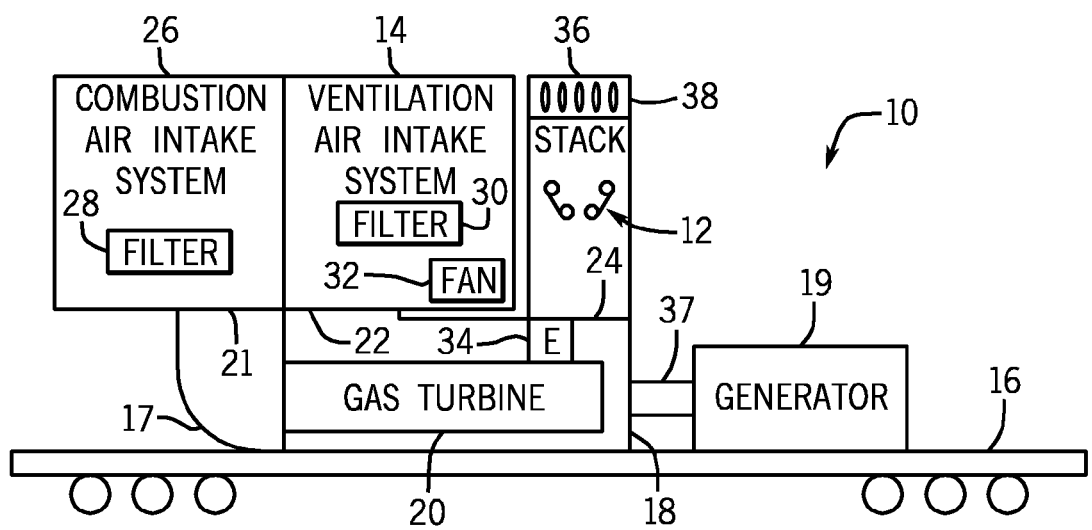
FIG. 1 is a schematic side view of an embodiment of a gas turbine generator having a diffuser plate disposed in an exhaust stack.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to systems for managing the exhaust flow from gas turbine engines, while ventilating enclosures that surround gas turbine engines. In order to avoid the buildup of heat around a gas turbine engine within an enclosure, a gas turbine system may include a ventilation system to ventilate heat and exhaust products out of the gas turbine enclosure. The gas turbine system also includes an eductor that functions as the primary ventilation system to aspirate the hot gases inside the gas turbine enclosure and exhaust products from the gas turbine exhaust collector into an exhaust stack with a silencer section. In the disclosed embodiments, the exhaust stack includes a diffuser plate, located upstream of a silencer section and downstream of the eductor, that functions to reduce the velocity of a mixed flow that includes the ventilating air flow from the gas turbine enclosure and an exhaust flow from the gas turbine engine, while maintaining static pressure levels that ensure the efficient operation of the eductor. The diffuser plate also functions to provide a homogenous flow distribution for the mixed flow downstream of the diffuser plate to the silencer section. In certain embodiments, the plate includes a pair of separate perforated plates arranged in a v-shape, where a width of the v-shape increases (e.g., perforated plates diverge) in a downstream direction along the exhaust stack. A pair of support bars attached to the lee-ward side of each perforated plate is configured to support the diffuser plate within the exhaust section. Each perforated plate includes multiple orifices having the same diameter. These systems are designed to take advantage of the exhaust driven eductor without significantly affecting the performance of the eductor, while increasing the life of the baffles in the silencer section, reducing noise emitted from the silencer section, and increasing the efficiency of the silencer and gas turbine generator.

FIG. 1 is a schematic side view of an embodiment of a gas turbine generator 10 (e.g., gas turbine system) having a diffuser section, e.g., a diffuser plate 12, disposed in the exhaust stack 36. The diffuser plate 12, in various embodiments, has applicability for any gas turbine, including both stationary and mobile gas turbine power generation units. As illustrated, the gas turbine generator 10 includes a mobile gas turbine power generation unit. The power generation unit 10 includes a trailer 16, a gas turbine enclosure 18 that houses a gas turbine engine 20 on the trailer 16, and an electrical generator 19 driven by the gas turbine engine 20 on the trailer 16. An air plenum 17 coupled to the gas turbine enclosure 18 defines a first intake port 21 (e.g., first air intake port or turbine air intake). The gas turbine enclosure 18 defines a second intake port 22 (e.g., second air intake port or enclosure ventilation intake) and an exit port 24 (e.g., exhaust collector exit). The first intake port 21 is coupled to a combustion air intake system 26 upstream from the gas turbine engine 20. The combustion air intake system 26 includes one or more filters 28 to filter air provided to the gas turbine engine 20. The first intake port 21 directs air into the gas turbine engine 20 via the air plenum 17. For example, the first intake port 21 may direct air into a compressor of the gas turbine engine 20. For example, the gas turbine engine 20 may compress the air from port 21, mix the air with fuel, and combust the air-fuel mixture to drive one or more turbines. The second intake port 22 is coupled to a ventilation air intake system 14. The ventilation air intake system 14 includes one or more filters 30 to filter air provided to the enclosure 18 of the gas turbine 20. The ventilation air intake system 14 provides air into the enclosure 18 via one or more fans 32 during engine shutdown only. When the engine 20 is in operation, the fans 32 are turned off and the ventilation air flows through a bypass section in order to reduce the flow resistance that the eductor system has to overcome. The second intake port 22 directs air into the enclosure 18 surrounding the gas turbine 20 to externally cool the turbine 20 and/or the surrounding volume in the enclosure 18. The enclosure 18 includes an eductor 34 to draw or suction air flow from the ventilation air intake system 14 through and out of the enclosure 18 adjacent the exit port 24 using exhaust flow generated by the gas turbine 20. The exit port 24 is coupled to an exhaust stack 36 for venting exhaust gases from the gas turbine 20 and ventilation air from the enclosure 18. The exhaust stack 36 includes a silencer section 38 to decrease noise associated with operation of the gas turbine generator 10 and the diffuser plate 12 disposed upstream of the silencer section 38 within the exhaust stack 36. The gas turbine 20 includes a drive shaft 37 that extends through the enclosure 18 and couples to the generator 19.

While use of the exhaust driven eductor 34 enables heat and exhaust products to be carried away from the enclosure 18 surrounding the gas turbine engine 20, the high velocity of the exhaust flow entering the exhaust stack 36 to drive the eductor 34 may adversely impact the silencer section 38 and the gas turbine generator 10 overall. As discussed below, the disclosed embodiments of the exhaust flow management systems include the diffuser plate 12 to reduce the velocity and kinetic energy of a mixed flow (i.e., ventilating air flow and exhaust flow) within the exhaust stack 36, while maintaining static pressure levels (i.e., does not cause back pressure effect) to ensure the efficient operation of the eductor 34. The diffuser plate 12 also functions to provide a homogenous flow distribution for the mixed flow downstream of the diffuser plate 12 to the silencer section 38. Also, the diffuser plate 12 provides a controlled flow distribution which is optimal for the silencer section 38. The diffuser plate 12 may include a pair of separate perforated plates arranged in a v-shape, where a width of the v-shape increases in a downstream direction along the exhaust stack 36. A pair of support bars attached to the lee-ward side of each perforated plate may support the diffuser plate 12 within the exhaust section 36. Each perforated plate includes multiple orifices having the same diameter. The diffuser plate 12 enables the system 10 to take advantage of the exhaust driven eductor 34 without significantly affecting the performance of the eductor 34, while increasing the life of the baffles in the silencer section 38, reducing noise emitted from the silencer section 38, and increasing the efficiency of the silencer section 38.

Figure 2:
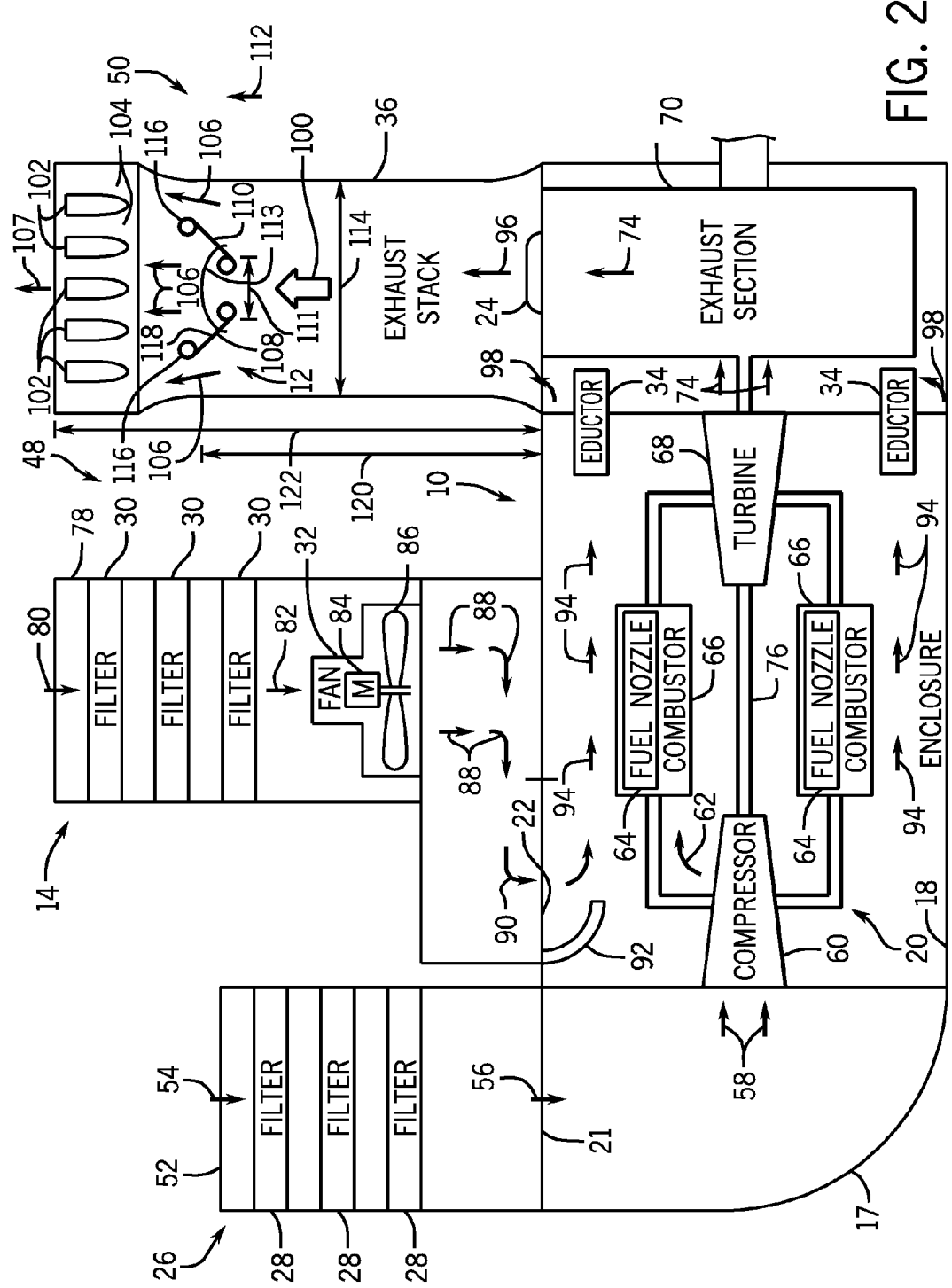
FIG. 2 is a detailed schematic view of an embodiment of the ventilation system and exhaust flow management system for a gas turbine system.

FIG. 2 provides further details as to the overall operation of a ventilation system 48 and exhaust flow management system 50 in conjunction with the gas turbine system 10. FIG. 2 is a detailed schematic view of an embodiment of the ventilation system 48 and exhaust flow management system 50 for the gas turbine system 10. The ventilation system 48 includes the ventilation air intake system 14 and the eductor 34. The exhaust flow management system 50 includes the exhaust stack 36 and its components (e.g., diffuser plate 12 and silencer section 38). The gas turbine system 10 includes the gas turbine engine 20 disposed in the enclosure 18. Air flows through an opening 52 into the combustion air intake system 26, as indicated by arrow 54, and flows through a plurality of filters 28 configured to filter the air. The air enters the enclosure 18 via the first air intake port 21, as indicated by arrow 56. The air plenum 17 directs the air 58 towards the gas turbine engine 20. The gas turbine engine 20 intakes the air 58 at a compressor 60, which compresses the air and directs compressed air 62 to one or more fuel nozzles 64 and combustors 66. The fuel nozzles 64 intake and mix fuel with the compressed air 62, and distribute the air-fuel mixture into the one or more combustors 66 in a suitable ratio for combustion. In certain embodiments, each combustor 66 includes one or more fuel nozzles 64. The air-fuel mixture combusts in a chamber within each combustor 66, thereby creating hot pressurized exhaust gases. Each combustor 66 directs the exhaust gases through a turbine 68 toward an exhaust section 70 as indicated by arrows 72. The exhaust section 70 directs the exhaust gases towards the exhaust stack 36, as indicated by arrow 74, through the exit port 24 (e.g., exhaust collector exit). In certain embodiments, for the eductor to work, the exit port 24 includes a nozzle-style profile to generate a high exhaust flow velocity from the exhaust section 70 to the exhaust stack 36. As the exhaust gases pass through the turbine 68, the gases force turbine blades to rotate a shaft 76 along an axis of the gas turbine engine 20. As illustrated, the shaft 76 may be connected to various components of the gas turbine engine 20, including the compressor 60. The compressor 60 also includes blades coupled to the shaft 76. As the shaft 76 rotates, the blades within the compressor 60 also rotate, thereby compressing air from an air intake (via the combustion air intake system 26) through the compressor 60 and into the fuel nozzles 64 and/or combustors 66. The shaft 76 may also be connected to a load, such as an electrical generator in an electrical power plant, for example.

Air also enters the enclosure 18 via the second air intake port 22 via the ventilation air intake system 14 coupled to the enclosure 18. As illustrated, air flows through an opening 78 into the ventilation air intake system 14, as indicated by arrow 80, and flows through a plurality of filters 30 configured to filter the air. Air flows into at least one fan 32 as indicated by arrow 82. As mentioned above, the ventilation air intake system 14 may include one or more fans 32. Each fan 32 includes a motor 84 to drive blades 86 to actively drive air flow through each fan 32, although these only operate during engine shutdown. During ventilation operations to ventilate the enclosure 18 of heat and exhaust products, the ventilation system 48 relies on the air drawn by the eductor system through a bypass channel to minimize pressure losses due to constrained sections and fan blockage. In cases of high ambient temperature conditions, if the temperature limits are surpassed inside the gas turbine enclosure 18, the ventilating air flow 88 also may be driven by the eductor 34 in combination with one of the fans 32.

Air flow from the one or more fans 32 enters the enclosure 18 via the second air intake port 22 as indicated by arrow 90. A guiding vane 92 guides the air flow 90 into the enclosure 18. Within the enclosure 18, the exhaust driven eductor 34 draws the air flow (e.g., ventilating air flow) as indicated by arrows 94 through the enclosure 18. The gas turbine enclosure 18 and components of the gas turbine engine 20 (e.g., the turbine 68 and the exhaust section 70) define narrow spaces between the engine 20 and the enclosure 18 near the exhaust stack 36. These narrow spaces form the eductor 34 configured to draw or suction the air flow 94 through and out of the enclosure 18 into the exhaust stack 36 during venting operations using the kinetic energy of the exhaust flow. In particular, exhaust gases 96 exiting from the enclosure 18 into the exhaust stack 36 via the exit port 24 create a vacuum (e.g., via a Venturi effect) that accelerates any air flow 94 present within the enclosure 18 through the eductor 34 and into the flow of exhaust gases 96, as indicated by ventilating air flow arrows 98, within the stack 36. Thus, the exhaust flow drives the eductor 34 to ventilate the enclosure 18 during operation of the gas turbine engine 20. In certain embodiments, the fans 32 may be used for ventilation while the gas turbine 20 is shutdown, starting up, or shutting down, while the eductor 34 may be used for ventilation during normal operation of the gas turbine 20.

The exhaust flow 96 and the ventilating air flow 94 mixes to form a high velocity mixed flow (e.g., in excess of 152.4 m/s) as indicated by arrow 100. The exhaust stack 36 includes a diffuser plate 12 disposed just below the lower tips of a plurality of silencer baffles 102 of the silencer section 38 (i.e., upstream of the silencer section 38). As the mixed flow 100 encounters the diffuser plate 12, the diffuser plate 12 decreases the momentum and velocity (e.g., fluid velocity) of the mixed flow 100 (i.e., absorbs some of the fluid kinetic energy of the mixed flow 100), while maintaining static pressure levels for operation of the eductor 34. In other words, the reduction in the velocity of the mixed flow 100 does not create a back pressure effect. In addition, the diffuser plate 12 provides a homogenous or even distribution of the mixed flow 100 to the baffles channels 104 as indicated by arrows 106.

Both the reduction in velocity and generation of the homogenous distribution (i.e., controlled distribution optimal for the silencer section 38) of the mixed flow 100 by the diffuser plate 12 do not affect the overall performance of the eductor 34. The silencer section 38 of the exhaust stack 36 outputs the mixed flow as indicated by arrow 107. The diffuser plate 12, by reducing the velocity and generating the homogenous distribution of the mixed flow 100, reduces the noise emitted from the silencer section 38. The diffuser plate 12 also helps to protect the silencer section 38 from high velocities, large fluctuations, and non-uniformity in the flow 100.

The configuration, shape, and location of the diffuser plate 34 enable the above functions of the diffuser plate 12. The diffuser plate 12 includes two separate perforated plates 108, 110. As described in greater detail below, each plate 108, 110 includes a plurality of orifices. In addition, each plate 108, 100 includes the same number of orifices arranged in the same pattern (e.g., rows). Further, each orifice of each plate 108, 110 has an equal diameter. The plates 108, 110 are arranged in a v-shape configuration to enable an angled orientation of the orifices to the high velocity mixed flow 100. Thus, the high velocity mixed flow 100 impinges on the angled plates 108, 110, loses some kinetic energy, and flows through the orifices and the sides of the plates 108, 110 as its partially diverted to the outermost sides of the exhaust stack 36. A width 111 of the v-shape configuration increases (e.g., plates 108, 110 diverge) in a downstream direction 112 along the exhaust stack 36 (i.e., from a base to a top of the v-shape configuration). To form the v-shape configuration of the diffuser plate 12, the plates 108, 110 are arranged at an angle 113. The angle 113 may range from approximately 90 to 170 or 110 to 160 degrees depending on the gas turbine system 10. For example, the angle 113 may be approximately 90, 95, 100, 105, 110, 115, 120, 125, 130, 135, 140, 145, 150, 155, or 160 degrees, or any other angle therebetween. In certain embodiments, the angle 113 between the plates 108, 110 is greater than or equal to approximately 140 degrees. In the v-shape configuration, the diffuser plate 12 only covers a central portion of the exhaust stack 36. In certain embodiments, the diffuser plate 12 may cover approximately 30 to 90 percent of a cross-sectional area 114 of the exhaust stack 36. For example, the diffuser plate 12 may cover approximately 30, 35, 40, 45, 50, 55, 60, 65, 70, 75, 80, 85, or 90 percent, or any other percent therebetween of the cross-sectional area 114 of the exhaust stack 36.

The diffuser plate 12 is mounted via support bars 116 within the exhaust stack 36. Each plate 108, 110 includes a pair of support bars 116 coupled on a lee-ward side 118 (i.e., side facing the silencer section 38) of the plate 108, 110. Locating the support bars 116 on the lee-ward side 118 minimizes the generation of undesired disturbances to the mixed flow 100 within the exhaust stack 36. The diffuser plate 12 is mounted or disposed far enough along the exhaust stack 36 away from the exit port 24 to allow enough free stack length to enable mixing between the exhaust flow 96 and the ventilating air flow 94 as well as to void excessive blockage of the flow path. In addition, the location of diffuser plate 12 is sufficiently far enough upstream or below the silencer section 38 to enable an even distribution (i.e., controlled distribution optimal for the silencer section 38) of the mixed flow 100 through the silencer section 38. In certain embodiments, the diffuser plate 12 may be located a length or distance 120 along the exhaust stack 36 from the exit port 24 that ranges from approximately 60 to 80 percent of a length 122 of the exhaust stack 36. For example, the distance 120 along the exhaust stack 36 from the exit port 24 may be approximately 60, 65, 70, 75, or 80 percent, or any other percent therebetween, of the length 122 of the exhaust stack 36. The overall configuration, shape, and design of the diffuser plate 12 enables the system 10 to take advantage of the exhaust driven eductor 34 without significantly affecting the performance of the eductor 34, while increasing the life of the baffles 102 in the silencer section 38, reducing noise emitted from the silencer section 38, and increasing the efficiency of the silencer section 38.

Figure 3:
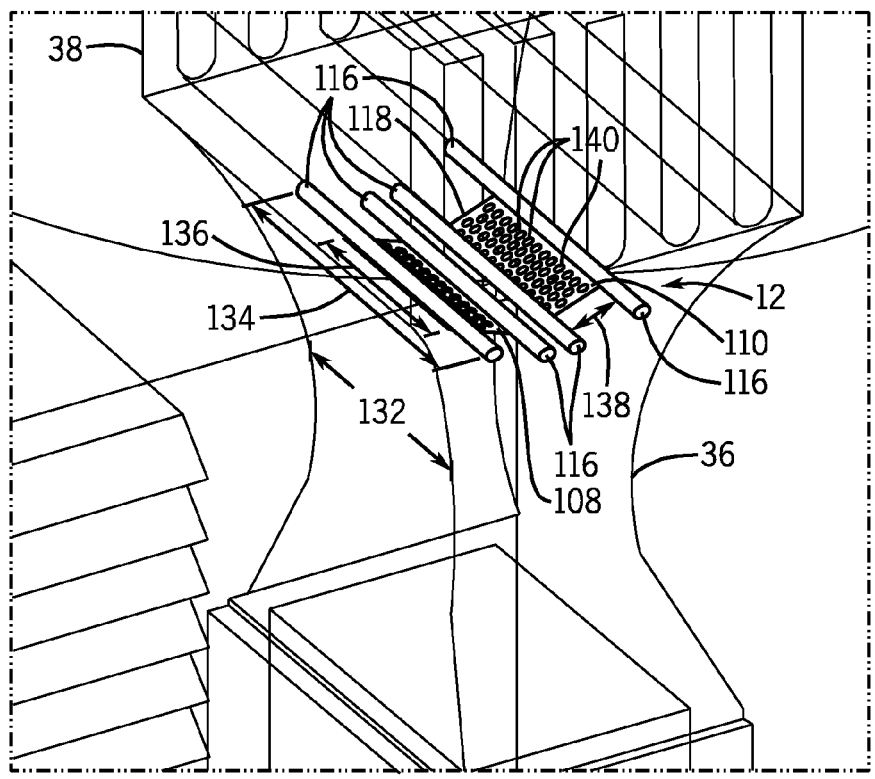
FIG. 3 is a top perspective view of a diffuser plate disposed in an exhaust stack.
Figure 4:
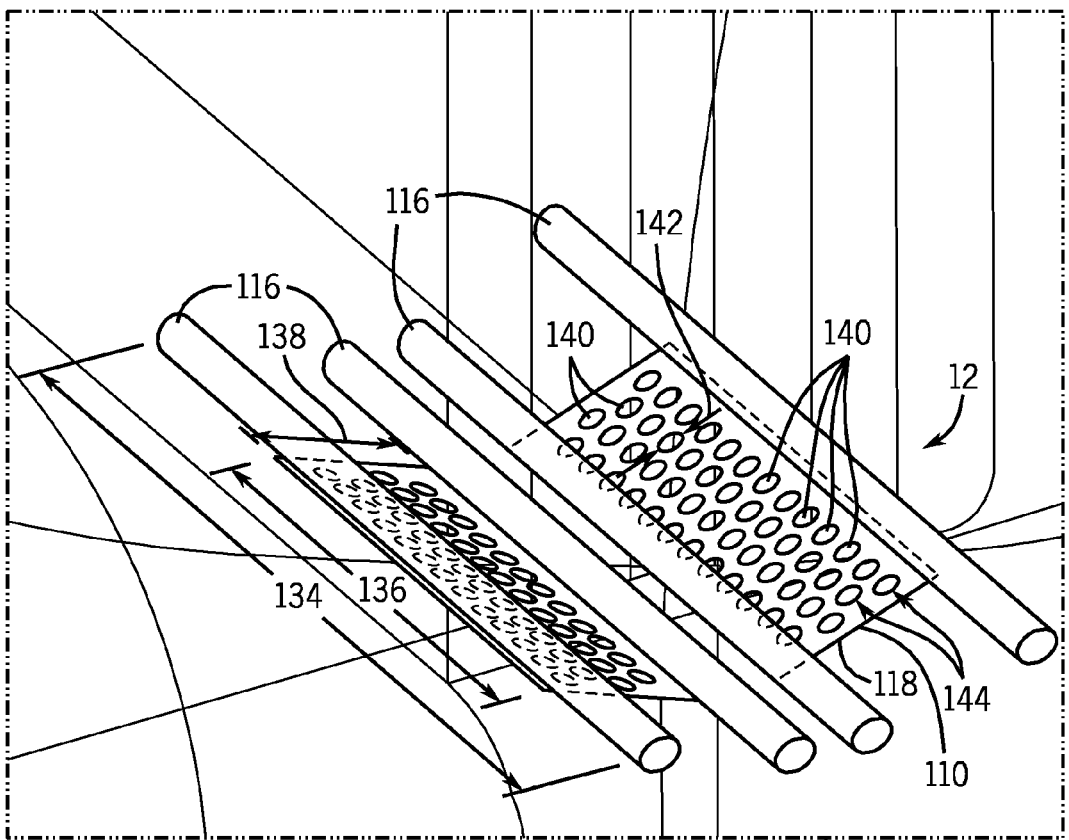
FIG. 4 is bottom perspective view of the diffuser plate disposed in the exhaust stack.

FIGS. 3 and 4 are perspective views of the diffuser plate 12 disposed in the exhaust stack 36. In general, the diffuser plate 12 is as described in FIGS. 1 and 2. As depicted, the diffuser plate 12 includes the perforated plates 108, 110 arranged in the v-shaped configuration within the exhaust stack 36 below or upstream of the silencer section 38 as described above. The diffuser plate 12 is mounted via the support bars 116 within the exhaust stack 36. Each plate 108, 110 includes a pair of support bars 116 coupled to the lee-ward side 118 (i.e., side facing the silencer section 38) of the plate 108, 110. As mentioned above, locating the support bars 116 on the lee-ward side 118 minimizes the generation of undesired disturbances to the mixed flow 100 within the exhaust stack 36. Each support bar 116 extends a width 132 of the exhaust stack 36. Thus, a length 134 of each support bar 116 is dependent on the width 132 of exhaust stack 36, which may vary between gas turbine systems 10.

Each plate 108, 110 includes a length 136 and a width 138. The lengths 136 and widths of the plates 108, 110 are the same to ensure homogenous distribution of the mixed flow 100. The length 136 and width 138 of each plate 108, 110 depend on the cross-sectional area 114 (see FIG. 2) of the exhaust stack 36. As mentioned above, the diffuser plate 12 only covers a central portion of the exhaust stack 36. In certain embodiments, the diffuser plate 12 may cover approximately 30 to 90 percent of the cross-sectional area 114 of the exhaust stack 36. For example, the diffuser plate 12 may cover approximately 30, 35, 40, 45, 50, 55, 60, 65, 70, 75, 80, 85, or 90 percent, or any other percent therebetween, of the cross-sectional area 114 of the exhaust stack 36.

In addition, each plate 108, 110 includes a plurality of orifices 140. The number of orifices 140 on each plate 108, 110 may be the same. The number of orifices 140 on each plate 108, 110 may range from 20 to 100 or any other number depending on the gas turbine system 10. As illustrated, each plate 108, 110 includes a total of 52 orifices 140. Also, as illustrated, the orifices 140 on each plate 108, 110 have an equal diameter 142. The equal diameter 142 of the orifices 140 enables the homogenous distribution of the mixed flow 100 to the silencer section 38. Also, the arrangement of the orifices 140 is the same between the plates 108, 110. As depicted, each plate 108, 110 includes four rows 144 with 13 orifices 140 each, wherein the orifices 140 of adjacent rows 144 are offset from each other. The same arrangement of the orifices 140 between rows 144 and between plates 108, 110 also enables the homogenous distribution (i.e., controlled distribution optimal for the silencer section 38) of the mixed flow 100 to the silencer section 38. As mentioned above, the high velocity mixed flow 100 impinges on the angled plates 108, 110, loses some kinetic energy, and flows through the orifices 140 to the silencer section 38. The overall configuration, shape, and design of the diffuser plate 12 enables the system 10 to take advantage of the exhaust driven eductor 34 without significantly affecting the performance of the eductor 34, while increasing the life of the baffles 102 in the silencer section 38, reducing noise emitted from the silencer section 38, and increasing the efficiency of the silencer section 38.

Technical effects of the disclosed embodiments include providing systems to manage the exhaust flow from gas turbine engines 20, while ventilating enclosures 18 that surround gas turbine engines 20. The gas turbine system 10 includes the eductor 34 that functions in conjunction with the ventilation system 48 to ventilate heat and exhaust products from the gas turbine enclosure 18 into the exhaust stack 36. The exhaust stack includes the diffuser plate 12, located upstream of the silencer section 38 of the exhaust stack 36, that functions to reduce the velocity of the mixed flow 100 that includes the ventilating air flow 94 from the gas turbine enclosure 18 and the exhaust flow 96 from the gas turbine engine 20, while maintaining static pressure levels that ensure the efficient operation of the eductor 34. The diffuser plate 12 also functions to provide a homogenous flow distribution (i.e., controlled distribution optimal for the silencer section 38) for the mixed flow 100 downstream of the diffuser plate 12 to the silencer section 38. In certain embodiments, the diffuser plate 12 includes a pair of separate perforated plates 108, 110 with multiple orifices 140 with the plates 108, 100 arranged in a v-shape, where the width 111 of the v-shape increases (e.g., plates 108, 110 diverge) in a downstream direction of the mixed flow 100 along the exhaust stack 36. The diffuser plates 12 enables the gas turbine system 10 to take advantage of the exhaust driven eductor 34 without significantly affecting the performance of the eductor 34, while increasing the life of the baffles 102 in the silencer section 38, reducing noise emitted from the silencer section 38, and increasing the efficiency of the silencer section 38.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    a gas turbine enclosure;
    a gas turbine engine disposed in the gas turbine enclosure, wherein the gas turbine engine is configured to output an exhaust flow;
    an exhaust driven eductor formed by the gas turbine enclosure and the gas turbine engine and configured to draw an air flow through and out of the gas turbine enclosure using the exhaust flow, wherein the air flow interfaces with surfaces of both the gas turbine enclosure and the gas turbine engine as it flows through the exhaust driven eductor;
    an exhaust stack coupled to the gas turbine enclosure, wherein the exhaust stack is configured to output a mixed flow of the exhaust flow and the air flow; and
    a diffuser plate disposed within the exhaust stack, wherein the diffuser plate is configured to provide a homogenous flow distribution for the mixed flow downstream of the diffuser plate.

2. The system of claim 1, wherein the diffuser plate comprises orifices.

3. The system of claim 1, wherein the diffuser plate comprises two separate perforated plates.

4. The system of claim 3, wherein the two separate perforated plates are offset from one another in a crosswise direction relative to a downstream direction through the exhaust stack.

5. The system of claim 3, wherein the two separate perforated plates are arranged in a v-shape, wherein a width of the v-shape increases in the downstream direction along the exhaust stack.

6. The system of claim 5, wherein diffuser plate comprises a pair of support bars coupled to a lee-ward side of each perforated plate.

7. The system of claim 1, wherein the diffuser plate is configured to reduce the velocity of the mixed flow while maintaining static pressure levels for operation of the exhaust driven eductor.

8. The system of claim 1, wherein the exhaust stack comprises a silencer section comprising a plurality of silencer baffles, and the diffuser plate is located upstream of the silencer section.

9. The system of claim 8, wherein the diffuser plate is configured to reduce noise emitted from the silencer section.

10. A system, comprising:
an exhaust driven eductor formed by a gas turbine enclosure and a gas turbine engine, wherein the exhaust driven eductor is configured to draw an air flow through and out of the gas turbine enclosure using an exhaust flow from the gas turbine engine disposed in the gas turbine enclosure, and wherein the air flow interfaces with surfaces of both the gas turbine enclosure and the gas turbine engine as it flows through the exhaust driven eductor; and
a diffuser plate configured to mount within an exhaust stack downstream from the exhaust driven eductor and upstream from a silencer section in the exhaust stack, wherein the diffuser plate is configured to provide an even flow distribution through the silencer section.

11. The system of claim 10, comprising the gas turbine enclosure, and the gas turbine engine is disposed in the gas turbine enclosure, wherein the gas turbine engine is configured to output the exhaust flow.

12. The system of claim 10, wherein the diffuser plate comprises orifices.

13. The system of claim 10, wherein the diffuser plate comprises two separate perforated plates offset from one another in a crosswise direction relative to a downstream direction through the exhaust stack.

14. The system of claim 13, wherein the two separate perforated plates are arranged in a v-shape, wherein a width of the v-shape increases in the downstream direction along the exhaust stack.

15. The system of claim 10, wherein the diffuser plate covers approximately 30 to 90 percent of a cross-sectional area of the exhaust stack.

16. The system of claim 10, wherein the diffuser plate is configured to reduce a velocity and improve uniformity of flow between the exhaust driven eductor and the silencer section.

17. The system of claim 10, comprising the exhaust stack coupled to the gas turbine enclosure, wherein the exhaust stack comprises the silencer section comprising a plurality of silencer baffles, and the exhaust stack is configured to output a mixed flow of the exhaust flow and the air flow through the silencer section.

18. A system, comprising:
a diffuser plate comprising a plurality of orifices, wherein the diffuser plate is configured to mount within an exhaust stack coupled to a gas turbine enclosure having a gas turbine, wherein the diffuser plate is configured to provide a homogenous flow distribution, downstream of the diffuser plate, for a mixed flow comprising an exhaust flow from the gas turbine and a ventilation air flow driven by an exhaust driven eductor, and wherein the diffuser plate is configured to mount within the exhaust stack downstream of where the exhaust flow and the ventilation air flow mix to form the mixed flow.

19. The system of claim 18, wherein the diffuser plate comprises two separate perforated plates arranged in a v-shape, and the two separate perforated plates are offset from one another in a crosswise direction relative to a downstream direction of the mixed flow through the exhaust stack.

20. The system of claim 19, wherein the diffuser plate covers approximately 30 to 90 percent of a cross-sectional area of the exhaust stack, and the v-shape of the two separate perforated plates has an angle of approximately 110 to 160 degrees.

21. The system of claim 1, wherein the exhaust stack is disposed downstream of the gas turbine enclosure.

22. The system of claim 1, wherein the diffuser plate is disposed within the exhaust stack downstream of where the exhaust flow and the air flow mix to form the mixed flow.

23. The system of claim 10, wherein the diffuser plate is configured to mount within the exhaust stack downstream from both the exhaust driven eductor and the gas turbine enclosure.

24. The system of claim 10, wherein the diffuser plate is configured to mount within the exhaust stack downstream of where the exhaust flow and the air flow mix to form a mixed flow.

25. The system of claim 18, wherein the diffuser plate is configured to mount within the exhaust stack downstream from both the exhaust driven eductor and the gas turbine enclosure.

* * * * *